(12) United States Patent
Maffin

(10) Patent No.: US 11,162,614 B2
(45) Date of Patent: Nov. 2, 2021

(54) FLOW CONTROL DEVICE

(71) Applicant: Severn Glocon Limited, Quedgeley (GB)

(72) Inventor: Nick Maffin, Gloucester (GB)

(73) Assignee: Severn Glocon Limited

(*) Notice: Subject to any disclaimer, the term of this patent is extended or adjusted under 35 U.S.C. 154(b) by 0 days.

(21) Appl. No.: 17/027,848

(22) Filed: Sep. 22, 2020

(65) Prior Publication Data

US 2021/0095787 A1    Apr. 1, 2021

(30) Foreign Application Priority Data

Sep. 27, 2019 (GB) .................................. 1913950

(51) Int. Cl.
*F16K 47/14* (2006.01)
*F16K 3/26* (2006.01)
*F16K 47/08* (2006.01)

(52) U.S. Cl.
CPC ............ *F16K 47/14* (2013.01); *F16K 3/26* (2013.01); *F16K 47/08* (2013.01)

(58) Field of Classification Search
CPC ............ F16K 47/14; F16K 3/26; F16K 47/08
USPC ................................. 138/40–46; 251/127
See application file for complete search history.

(56) References Cited

U.S. PATENT DOCUMENTS

| | | | | |
|---|---|---|---|---|
| 3,323,550 A * | 6/1967 | Lee, II | ............... | F15C 1/16 138/39 |
| 3,375,855 A * | 4/1968 | Deeks | ............... | F22B 37/545 138/42 |
| 3,513,864 A * | 5/1970 | Self | ............... | F16K 47/08 137/14 |
| 3,722,854 A * | 3/1973 | Parola | ............... | F16K 47/08 251/127 |
| 3,789,880 A * | 2/1974 | Armstrong | ............... | F16K 47/14 137/625.3 |
| 3,908,698 A * | 9/1975 | Baumann | ............... | F16K 47/08 137/625.3 |
| 3,917,221 A * | 11/1975 | Kubota | ............... | F16K 47/08 251/127 |
| 3,954,124 A | 5/1976 | Shelf | | |
| 4,327,757 A * | 5/1982 | Weevers | ............... | F16K 47/08 137/625.3 |
| 8,733,403 B2 * | 5/2014 | Diaz | ............... | E03C 1/08 138/42 |

FOREIGN PATENT DOCUMENTS

| | | |
|---|---|---|
| GB | 1405850 | 9/1975 |
| GB | 2054103 | 2/1981 |
| GB | 2318629 | 4/1998 |
| WO | WO2009/156878 | 12/2009 |

* cited by examiner

*Primary Examiner* — John Bastianelli
(74) *Attorney, Agent, or Firm* — Anthony J. Bourget

(57) ABSTRACT

A flow control device is described comprising a generally cylindrical cage 12 including a series of perforations 14 defining, in part, convoluted flow paths between inner and outer peripheries of the device 10, and fences 18 restricting axial flow along at least one of the inner and outer periphery of the cage 12, wherein at least one of the fences 18 is shaped to include a first section 18a at a first axial position, a second section 18b at an axial position spaced from the first section 18a, and interconnecting sections 18c interconnecting the first and second sections 18a, 18b.

10 Claims, 2 Drawing Sheets

FLOW CONTROL DEVICE

This invention relates to a flow control device for modifying the fluid flow through a device such as a valve, controlling the fluid flow rate and/or pressure drop within the device.

A number of flow control devices are known. One form of flow control device comprises two or more cylindrical members or cages nested within each other, and each of which is provided with a series of perforations or openings. The cages are spaced apart from one another to define annular flow passages therebetween. The cages are positioned relative to one another such that the perforations provided in one of the cages are out of alignment with the perforations provided in the other of the cages. Accordingly, fluid flowing through the flow control device between an inner periphery and an outer periphery thereof is forced to undergo a series of changes in flow direction. Annular fences are located within the annular flow passages between the cages to prevent significant axial flow, the fences conveniently being formed integrally with certain ones of the cages.

The perforations provided within the cages are arranged in rows extending around the periphery of each cage. The perforations in adjacent rows may be staggered relative to one another, and the annular fences are provided between every, say, two rows of perforations.

A plug extends into the central passage of the device, cooperating with the inner peripheral surface and the perforations provided therein to control which of the perforations are open and which are obscured by the plug at any given time. It will be appreciated that, in use, relative movement between the plug and the remainder of the flow control device opens or closes parts of the flow control device, and so controls the available flow area within the device. Accordingly, flow through the device is controlled.

One disadvantage with an arrangement of the type described hereinbefore is that the relationship between the distance moved by the plug relative to the remainder of the device and the consequential change in the restriction to flow formed by the device is not linear. Rather, the presence of the fences results in the spacing of the perforations, in the axial direction of the device, being such that dead bands in the movement of the plug are present as the control edge of the plug passes across the regions in which no perforations are formed, these regions being aligned with the positions of each of the fences. As the plug passes through these dead band positions, little, if any, increase or decrease in flow area occurs. As a consequence, accurate control over fluid flow using such a device is difficult to achieve when a valve incorporating the device occupies or is close to one of these dead band positions, or where the desired position of the valve to achieve a required flow characteristic is close to one of these dead band positions.

It is an object of the invention to provide a flow control device of relatively simple and convenient form and in which the presence of such dead bands, and associated difficulties in achieving accurate control are overcome or are of reduced effect.

According to the present invention there is provided a flow control device comprising a generally cylindrical cage including a series of perforations defining, in part, convoluted flow paths between inner and outer peripheries of the device, and fences restricting axial flow along at least one of the inner and outer periphery of the cage, wherein at least one of the fences is shaped to include a first section at a first axial position, a second section at an axial position spaced from the first section, and interconnecting sections interconnecting the first and second sections, wherein the perforations are spaced from the fences so that a flat land is present surrounding each perforation.

Preferably, a flat land surrounds every perforation.

It will be appreciated that by providing a fence of this form, the perforations can be arranged so that, as the control edge of the plug approaches and passes over the level of the fence, the control edge of the plug will clear the level of the first section of the fence at a different point in the travel of the plug from that where it clears the level of the second section of the plug. By appropriate positioning of the perforations, as permitted through the use of a fence of this shape, there need be no point in the travel of the plug at which movement of the plug has no impact upon the available flow area, or the presence of such points is reduced. The presence of dead bands as mentioned hereinbefore, and the negative impact that they have upon achieving accurate flow control, is thus avoided or the effects thereof are reduced. Furthermore, the shaping of the fence may serve to interfere with flow around the annulus formed between two adjacent ones of the fences, and so may achieve a further reduction in fluid pressure compared to a traditional flow control device design.

The presence of the flat lands or areas surrounding the perforations increases turbulence in the fluid flow through the device and so enhances the performance thereof.

The fence may be of wave like form.

The perforations provided in the cage preferably take the form of series of rows of openings.

Preferably, at least the rows of openings adjacent the fence are arranged in a staggered pattern with the openings close to the second section of the fence axially spaced from the openings adjacent the first section of the fence. The arrangement is preferably such that at least some of the openings of a row immediately adjacent one side of the fence overlap, in an axial direction of the device, at least some of the openings of a row immediately adjacent an opposite side of the fence.

The invention will further be described, by way of example, with reference to the accompanying drawings, in which.

Figure 1:
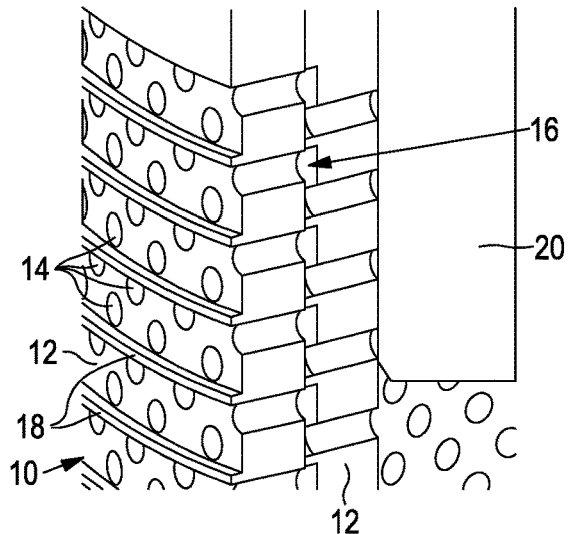
FIG. 1 is a view illustrating a typical flow control device, with an outer cage member thereof omitted.
Figure 2:
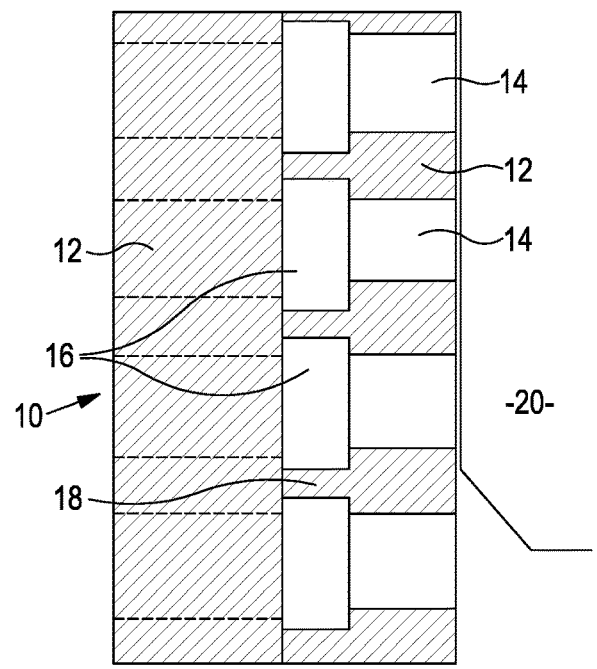
FIG. 2 is a diagrammatic cross-sectional view illustrating part of a flow control device of the type shown in FIG. 1.
Figure 3:
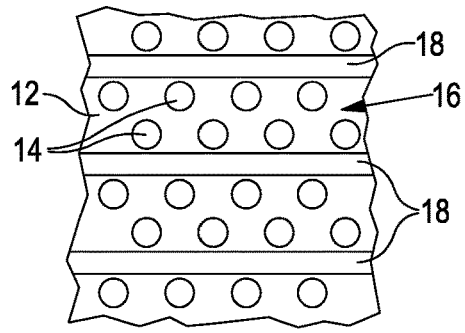
FIG. 3 is a diagrammatic view illustrating part of a face of part of the device of FIGS. 1 and 2.

Referring to FIGS. 1 to 3, a typical flow control device 10 is illustrated. The flow control device 10 comprises a plurality of cylindrical cage members 12 arranged in a nested configuration. The members 12 are each of perforated form, being provided with rows of openings 14. The cage members 12 are dimensioned, relative to one another, to define annular flow chambers 16 therebetween. Each of the cage members 12 is provided, on its outer periphery, with a series of annular walls or fences 18, the outer faces of which bear against the inner surfaces of the adjacent ones of the cage members 12 so as to divide the flow chambers 16 into annular rings which are isolated from one another, such that fluid flow within the chambers 16 in the axial direction of the device 10 is restricted.

The rows of openings 14 are arranged in pairs, and the adjacent ones of the rows of openings 14 are staggered relative to one another, as shown in FIGS. 1 and 3. Each pair of rows is spaced from each adjacent pair of rows by a respective one of the fences 18. The openings 14, flow chambers 16 and fences 18 serve to define a series of convoluted flow passages extending between the inner and outer peripheral surfaces of the device, the flow passages at different axial positions within the device 10 being substantially isolated from one another by the fences 18. Whilst arranging the openings 14 in pairs of rows represents one convenient arrangement, it will be appreciated that the invention is not restricted in this regard.

The cage members 12 are arranged such that the openings 14 in each cage member 12 are not aligned with the openings 12 in an adjacent one of the cage members 12. Accordingly, fluid flowing through the device 10 has to undergo a number of changes in flow direction as it passes between the inner and outer peripheral surfaces of the device 10. At each change in flow direction, a quantity of energy is dissipated and as a consequence, the fluid pressure is reduced. The openings 14 may all be of a uniform size laid out in a regular pattern, or they may vary in size or layout, as required to achieve a desired flow characteristic through the device 10.

The fluid flowing through the device 10 may take the form of a liquid or a gas, and may flow through the device 10 in either direction, from the outer periphery towards the inner periphery, or from the inner periphery towards the outer periphery.

As shown in FIGS. 1 and 2, the device 10 further comprises a plug 20 located within the central passage defined by the cage members 12. The plug 20 cooperates with the inner surface of the innermost one of the cage members 12, and the openings 14 provided therein, to control which of the openings 14 thereof are open and which are obscured, and so closed, by the plug 20.

Movement of the plug 20 to increase the number of openings 14 that are not obscured increases the number of flow passages available for fluid flow through the device 10, movement of the plug 20 in the opposite direction reducing the number of flow passages available for use.

As shown in FIG. 3, whilst the rows of openings 14 within each pair may partially overlap one another in the axial direction of the device 10, the provision of the fences 18 results in the openings 14 of a row immediately to one side of each fence 18 and the openings 14 of the row immediately to the opposite side of the respective fence 18 being axially spaced apart from one another, there being no axial overlap therebetween. As a consequence, there are a number of axial positions of the plug 20 in which subsequent movement of the plug 20 does not immediately result in an increase or decrease in the available flow area through the device 10. Rather, within these dead bands, movement of the plug 20 has little or no effect upon the operation of the device 10. This is undesirable as it makes accurate control of the fluid flow more complex.

Figure 4:
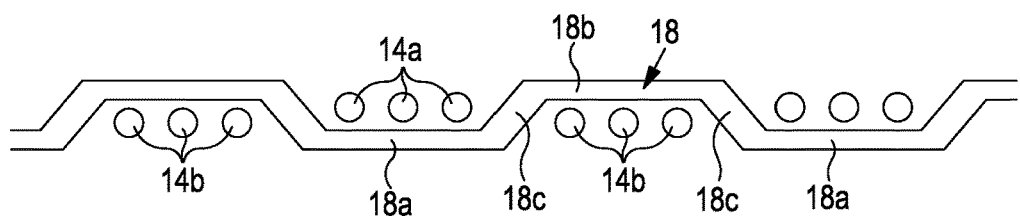
FIG. 4 is a view illustrating part of a face of part of a flow control device in accordance with an embodiment of the invention.
Figure 5A:
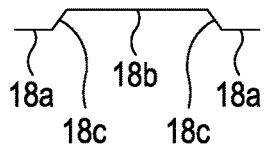
FIGS. 5a, 5b, 5c, 5d, 5e and 5f are diagrammatic views illustrating several alternative configurations.
Figure 5B:
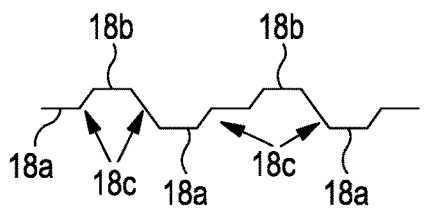
Figure 5C:
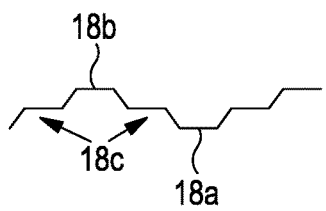
Figure 5D:
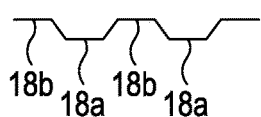
Figure 5E:
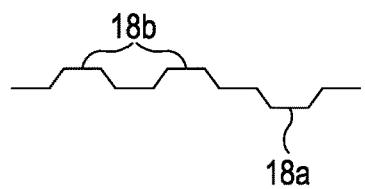
Figure 5F:
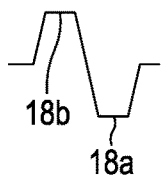

In accordance with the present invention, the presence of these dead bands is eliminated or reduced by modifying the shape of at least one of the fences 18 to include a first section 18a at a first axial position and a second section 18b at a second axial position, the fence 18 further including connecting sections 18c interconnecting the first and second sections 18a, 18b, for example as shown in FIG. 4. Each fence 18 thus extends continuously around the associated cage member 12 and so serves to resist axial flows of fluid within the annular chamber 16 in much the same manner as in the typical arrangement of FIGS. 1 to 3. However, the shaping of the fence 18 allows the openings 14 of each row, or at least of some of the rows, to be arranged in a staggered pattern so that they are not all located at the same axial position within the device 10. Accordingly, certain of the openings 14 (openings 14a in FIG. 4) of a row of openings 14 located immediately adjacent one side of a fence 18 axially overlap parts of at least some of the openings 14 (openings 14b in FIG. 4) of the row located immediately adjacent the opposite side of that fence 18 as denoted by the horizontal line in FIG. 4. The axial spacing of the openings 14a, 14b from the rest of the rows of openings 14 in the device may be as desired. Accordingly, in use, during opening movement of the plug 20, opening or uncovering of certain of the openings 14 (openings 14a) to one side of the fence 18 will commence before opening or uncovering of the openings 14b to the opposite side of the fence 18 has been completed. The shaping of the fence 18 thus allows the positioning of the openings 14, 14a, 14b in a pattern allowing the presence of a dead band to be avoided. A more linear relationship between the position of the plug 20 and the restriction to fluid flow formed by the device 10 may thus be achieved, and better control over fluid flow may be attained.

Figure 7A:
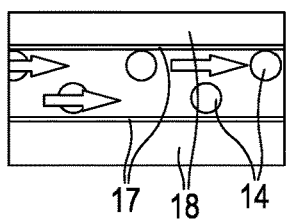
FIGS. 7a, 7b and 7c illustrate operation of the invention.
Figure 7B:
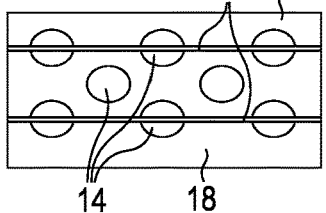
Figure 7C:
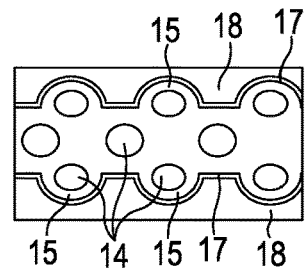

As illustrated, a flat area or land 15 surrounds each of the openings 14a, 14b, these openings being spaced from the adjacent parts of the fence 18. Preferably, all of the openings 14 are so spaced. As shown in FIGS. 7a, 7b and 7c, the presence of the areas or lands 15 serves to disrupt fluid flow through the device, enhancing or increasing the generation of turbulence therein, whilst allowing fluid flow at a desired flow rate. FIG. 7a illustrates a conventional arrangement in which the fences 18 are of straight form and define annular flow passages denoted by lines 17 along or around which fluid can flow. If the openings 14 are located so that the extend, in part, into the fences 18 as shown in FIG. 7b then the fluid flow along or around the annular flow passages will tend to be such that fluid flow into the openings 14 is restricted, parts of the openings 14 lying outside of the flow path typically taken by fluid passing along or around the flow passage as denoted by lines 17. The fences 18 serve to obscure parts of the openings 14. By introducing a flat area or land 15 surrounding each opening 14 as shown in FIG. 7c, the shape of the flow path changes as denoted by the lines 17 of FIG. 7c, and the openings 14 are fully accessible and so access thereto is not restricted in the manner of FIG. 7b. Friction between the flat areas or lands 15 and the fluid, and between the curved parts of the fences 18 and the fluid, further serves to achieve a fluid pressure reduction, in use.

Although FIG. 4 only shows one second region 18b, in reality each fence 18 may include several such regions 18b spaced apart around the periphery of the respective cage member 12.

Each cage member 12 may include fences 18 of the type described hereinbefore, or some of the cage members 12 may include conventional annular fences 18 with just the innermost one of the cage members 12 including fences 18 shaped in accordance with the invention to allow the presence of a dead band to be avoided.

Whilst FIG. 4 illustrates a relatively simple shape for the fence 18 and corresponding layout or pattern for the openings 14, it will be appreciated that a number of other fence shapes or profiles are possible without departing from the scope of the invention. Some example profiles are shown in FIGS. 5a to 5f. In each case, the shape of the fence 18 is chosen in such a fashion that some of the openings 14 located immediately adjacent one side of the fence 18 may partially or fully overlap, in the axial direction of the device 10, certain of the openings 14 located immediately to the opposite side of the fence 18.

Although a major advantage of the arrangement described hereinbefore is that the presence of dead bands can be avoided, or the effects thereof can be reduced, another advantage of the arrangement is that fluid flowing around the annular chamber 16 is urged to follow a more convoluted path as a result of the fences 18 being of wavy rather than straight form. Consequently, additional turbulence may be induced in such flows of fluid, leading to further energy dissipation.

The outer periphery of the outermost one of the cage members 12 may be of smooth form, not including fences 18. However, in some applications, it may be desirable for such fences 18 to be provided, and for the fences 18 to have a form similar to that described hereinbefore for the purpose of increasing turbulence in the fluid flow. It will be appreciated that, where the fences are intended to promote the formation of a turbulent flow around the outer periphery of the device, they need not extend continuously around the entire periphery of the device. They could be shaped to take the form of, for example, discrete vertically/axially extending walls, steps, or angled walls. Obviously, they could take other forms.

Figure 6:
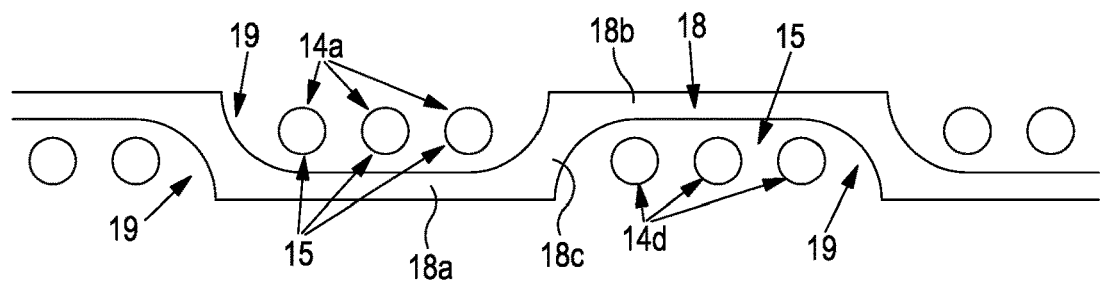
FIG. 6 is a view similar to FIG. 4 illustrating a further alternative configuration.
Figure 6A:
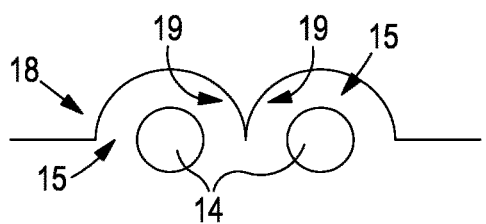
FIG. 6a illustrates an alternative to the arrangement shown in FIG. 6.

In the arrangements described hereinbefore, the fences 18 are of substantially uniform wall thickness. However, this need not always be the case, and they could be of varying wall thickness. The variations in wall thickness may give rise to the fences 18 defining the first, second and interconnecting sections. By way of example, FIG. 6 illustrates an embodiment in which fences 18 are of generally annular form with a uniform wall thickness, but in which recesses 19 accommodating the openings 14 are provided. The recesses 19 may be formed by milling, for example prior to the drilling of the openings 14. This allows several openings 14 to be located within a single recess 19, if desired, and allows the formation of the lands 15 surrounding the openings 14. Alternatively, as shown in FIG. 6a, the recesses 19 and openings 14 may be formed as part of a single mill and drill operation. In both arrangements, the milling or shaping of the fences 18 results in the formation of lands 15 spacing the openings 14 from the fences 18 with the result that, in use, turbulence may be increased and so the operation of the device enhanced. The presence of the recesses results in the fences 18 having sections of thin wall thickness and sections of thicker wall thickness. In the arrangement shown, the interconnecting sections 18c are of greater wall thickness than the first and second sections 18a, 18b. It will be appreciated that this arrangement is relatively simple to produce.

Whilst the invention is primarily directed towards flow control devices of the type in which a plurality of cage members 12 are provided in a nested configuration as described hereinbefore, it will be appreciated that at least some of the benefits of the invention may be present in arrangements including a single cage member 12, the presence of wavy or non-straight fences 18 on the outer surface thereof having the benefit outlined above.

Although the description hereinbefore is of an arrangement in which a series of openings are arranged in rows, it will be appreciated that other configurations are possible, for example relatively few, large openings could be provided instead of a number of small openings. The openings may be of circular shape, or may be of other shapes.

Whilst specific embodiments of the invention are described hereinbefore with reference to the accompanying drawings, it will be appreciated that a wide range of modifications and alterations may be made to the described arrangements without departing from the scope of the invention as defined by the appended claims.

The invention claimed is:

1. A flow control device comprising a generally cylindrical cage including a series of perforations defining, in part, convoluted flow paths between inner and outer peripheries of the device, and fences restricting axial flow along at least one of the inner and outer periphery of the cage, wherein at least one of the fences is shaped to include a first section at a first axial position, a second section at an axial position spaced from the first section, and interconnecting sections interconnecting the first and second sections, wherein the perforations are spaced from the fences so that a flat land is present surrounding each perforation.

2. A device according to claim 1, wherein a flat land surrounds every perforation.

3. A device according to claim 1, wherein the fence is of wave like form.

4. A device according to claim 1, wherein the perforations provided in the cage take the form of series of rows of openings.

5. A device according to claim 4, wherein at least the rows of openings adjacent the fence are arranged in a staggered pattern with the openings close to the second section of the fence axially spaced from the openings adjacent the first section of the fence.

6. A device according to claim 4, wherein at least some of the openings of a row immediately adjacent one side of the fence overlap, in an axial direction of the device, at least some of the openings of a row immediately adjacent an opposite side of the fence.

7. A device according to claim 1, and including a movable plug operable to obscure at least some of the openings.

8. A device according to claim 1, wherein a recess is formed in the fence, at least one perforation being accommodated within the recess.

9. A device according to claim 8, wherein a plurality of perforations are accommodated within the recess.

10. A device according to claim 8 wherein a single perforation is accommodated within the recess.

* * * * *